J. C. BARRETT.
MEASURING INSTRUMENT.
APPLICATION FILED MAY 10, 1916.
1,305,640.
Patented June 3, 1919.
2 SHEETS—SHEET 1.
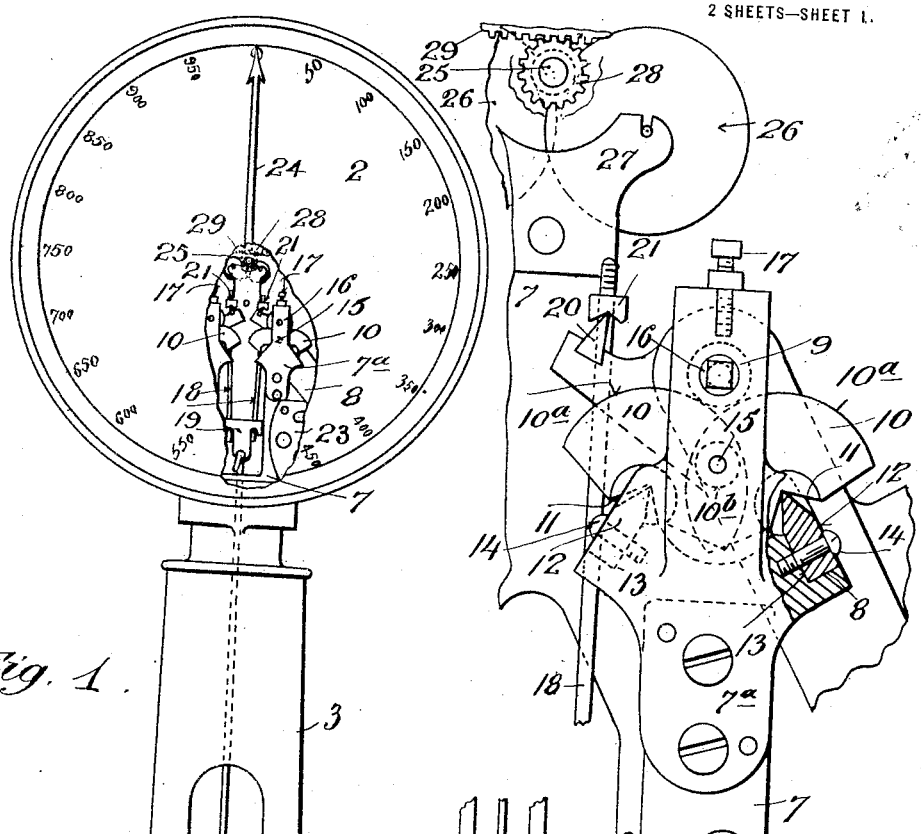
Fig. 1.
Fig. 3.
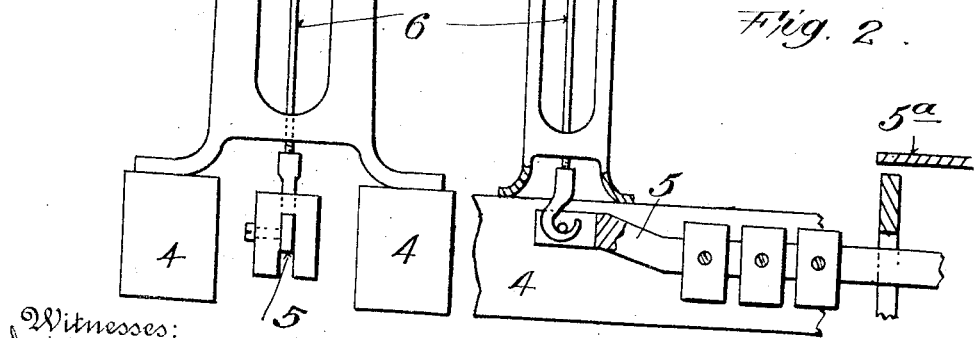
Fig. 2.
Witnesses:
C. W. Benjamin
Inventor
Joseph C. Barrett
By his Attorney
T. F. Bourne J. C. BARRETT.
MEASURING INSTRUMENT.
APPLICATION FILED MAY 10, 1916.
1,305,640.
Patented June 3, 1919.
2 SHEETS—SHEET 2.
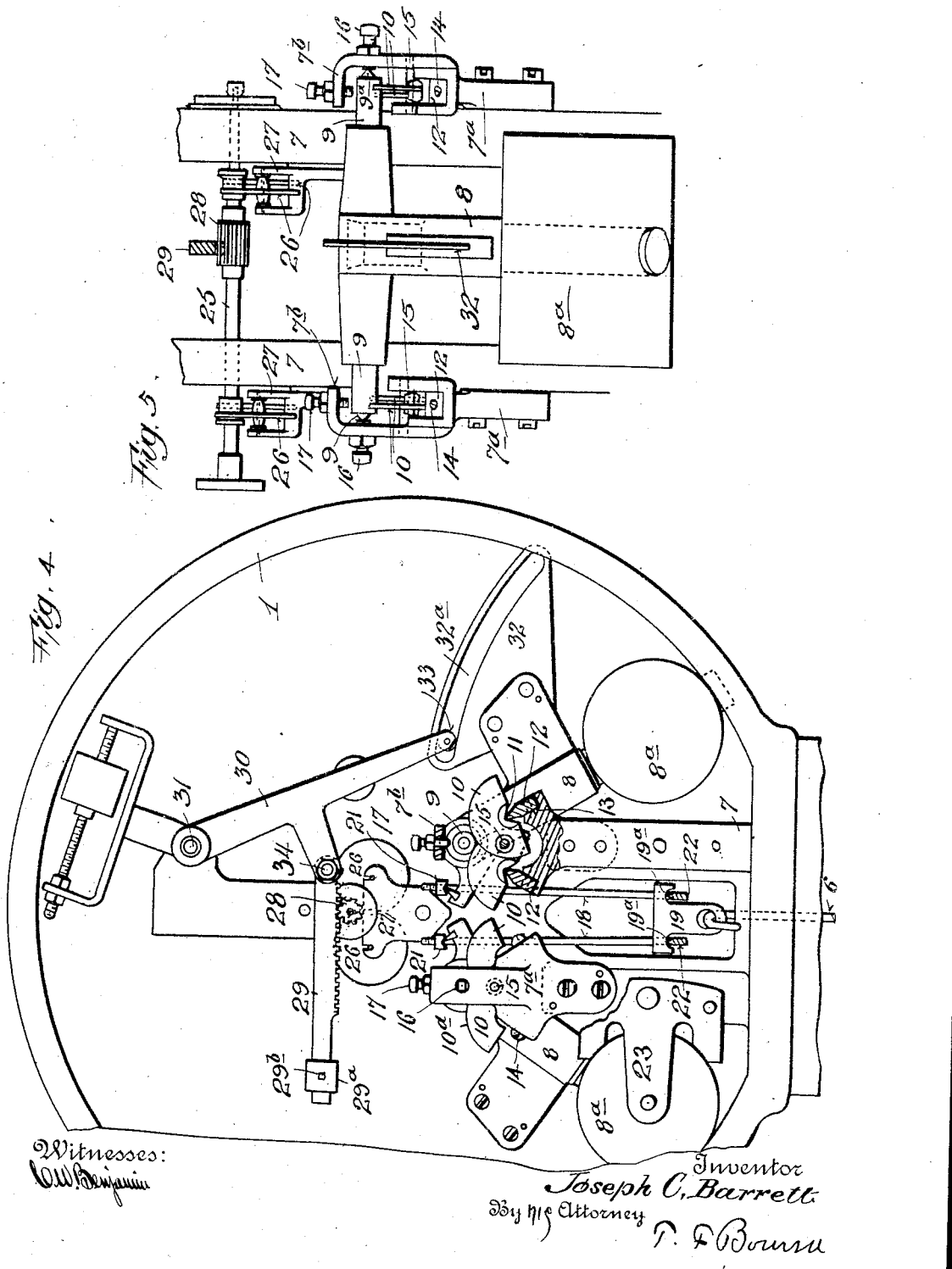

UNITED STATES PATENT OFFICE.

JOSEPH C. BARRETT, OF BROOKLYN, NEW YORK.

MEASURING INSTRUMENT.

1,305,640.  Specification of Letters Patent.  Patented June 3, 1919.

Application filed May 10, 1916. Serial No. 96,486.

*To all whom it may concern:*

Be it known that I, JOSEPH C. BARRETT, a citizen of the United States, and resident of New York city, borough of Brooklyn, in the county of Kings and State of New York, have invented certain new and useful Improvements in Measuring Instruments, of which the following is a specification.

My invention relates to improvements in measuring instruments, and has particular reference to such instruments commonly called automatic weighing scales, wherein an indicator or pointer is automatically operated by an article placed upon the scale platform, pan or the like, to automatically indicate the weight thereof.

The object of my invention is to provide scale mechanism embodying means to support the balancing devices thereof with as little frictional resistance as possible, and to avoid presenting surfaces adapted to accumulate or retain foreign substances, such as dust and the like, that are detrimental to the accuracy of operation of the scale mechanism, whereby the balancing devices may move freely at all times.

In the example of my invention illustrated in the accompanying drawings I provide one or more weighted arms or levers that are connected with draft mechanism, which arms are provided with pivots or gudgeons supported upon movable members which are in turn supported by knife edges, whereby said members may rock relatively to the knife edges under the influence of the weighted lever or arm as the latter is actuated or influenced by the draft mechanism.

My invention also comprises novel details of improvement and combinations of parts that will be more fully hereinafter set forth and then pointed out in the claims.

Reference is to be had to the accompanying drawings forming part hereof, wherein, Figure 1 is a front elevation of a portion of a scale mechanism embodying my invention, part of the dial being broken away;

Fig. 2 is a partly sectional side view of a portion of Fig. 1;

Fig. 3 is an enlarged detail view of Fig. 1, partly in section;

Fig. 4 is an enlarged detail view of parts shown in Fig. 1, partly in section, and Fig. 5 is a view looking from the right-hand side of Fig. 4, the casing being removed.

Similar numerals of reference indicate corresponding parts in the several views.

The numeral 1 indicates a suitable casing or frame adapted to contain the weighing mechanism hereinafter described, which casing is shown provided with a suitable dial 2 which may be applied thereto in any well-known manner. The casing 1 is supported upon a standard or upright 3, rising from a base 4. At 5 is a lever and at $5^a$ is a portion of a platform to coact with lever 5, a draft rod 6 being adapted to be operated by lever 5, which parts may be of any suitable or usual construction in scale mechanisms. At 7 is a suitable frame supported by standard or upright 3 and shown within casing 1. At 8 is a weighted lever adapted for connection with the draft mechanism, as with draft rod 6. One or more of such levers may be provided in a scale according to the character of scale and the articles to be weighed. As each of the levers 8 and the supporting means therefor I have illustrated are similar, a description of one will suffice for both. The lever 8 is provided between its ends with laterally disposed pivots or gudgeons 9 that are supported by corresponding pairs of spaced movable members 10 upon which pivots or gudgeons 9 may roll or rotate. Members 10 are supported to rock upon spaced corresponding pairs of knife edges, and the upper curved surfaces $10^a$ of said members are located side by side, and lap one another, in such manner that the pivots or gudgeons 9 rest upon the curved surfaces of the corresponding pairs of members 10. In the arrangement I have illustrated the under sides of members 10 are provided with V-like or triangular recesses at 11 receiving knife edge supports 12 in the apex of the corresponding recess, whereby the members 10 are supported to rock freely in a substantially frictionless manner. The knife edges 12 are shown supported upon frame 7, and to securely hold said knife edges in proper position and from movement I have shown the brackets $7^a$ on frame 7 provided with recesses at 13 in which the knife edges are set, and said knife edges may be there secured by screws 14 passing through the knife edges and entering said brackets. As illustrated, the knife edges 12 are so located that planes passing through the apices or sharpened ends of the knife edges coincide at the axis of the pivots or gudgeons 9 of lever 8, the apices of the recesses 11 of the corresponding members 10 also lying in such corresponding planes, whereby the weight of and that imposed upon lever 8 is transmitted to the members 10 and to the knife edges along or in the direction of such planes, from the points on the peripheries of the pivots or gudgeons 9 where they touch the peripheries of the corresponding members 10 in such planes, whereby direct thrusts of the weight are imposed through members 10 upon the knife edges in any position of said members. By the means described the members 10 are delicately, yet positively, supported to rock or oscillate upon knife edges, with a minimum of friction in either direction of movement of said members, as caused by the rotation of the pivots or gudgeons 9 in contact therewith, in various positions in which the lever 8 may be tilted by reason of the load upon the platform or scale pan through the draft mechanism connected with the lever. The construction described is further advantageous and beneficial since it affords protection against the accumulation of dust and other foreign matter between members 10 and their supports 12 which would have a tendency to detract from the accuracy of action of the scale mechanism, and is superior to the support of a weighted lever in a scale mechanism upon rollers having the ordinary annular bearings which are adapted to accumulate dust and foreign substances as well as oil, and thereby detract from the accuracy of the scale from time to time. To limit the rocking movement of members 10 with respect to the knife edges, I have shown said members provided with opposing apertures 10$^b$ receiving a pin 15 carried by the bracket 7$^a$, whereby if lever 8 be lifted from members 10, the latter will not fall off the knife edges. To limit endwise movement of pivots or gudgeons 9 I have shown the latter provided with pointed ends at 9$^a$ adapted to abut screws 16 that are carried by the brackets 7$^a$, Fig. 5. Of course, the ends of the screws can be tapered to engage flat or suitable ends of the pivots or gudgeons. To limit upward movement of lever 8 or hold the pivots 9 in firm contact with the members 10, particularly when the scale is being transported, I have shown screws 17 fitted to the overhanging projections 7$^b$ of brackets 7$^a$, adapted to be screwed down upon the pivots or gudgeons.

The upper end of lever 8 is to be connected with draft mechanism, such as draft rod 6. For such purpose I have shown rod 18 movably connected with lever 8 and with a pulling device 19 connected with draft rod 6. To reduce friction between the parts 8, 18 and 19, I have shown the upper end of lever 8 provided with a knife edge 20 receiving a V-like stop or seat 21 threaded upon the end of rod 18, and the lower end of rod 18 is shown provided with a knife edge at 22 entering V-like recess 19$^a$ in pulling device 19, whereby when draft rod 6 is pulled down under the influence of the article being weighed upon the scale platform or pan, lever 8 will be tilted and the knife edges at 20 and 22 will reduce friction and resist the detrimental effects incident in scale mechanisms to the accumulation of dust at draft rod connections.

Where two levers 8 are provided in a scale mechanism, as illustrated in the accompanying drawings, the pulling device 19 may have a pair of recesses 19$^a$ receiving knife edges 22 carried by corresponding rods 18, each of such rods having a stop 21 receiving knife edges 20 on the corresponding lever 8, whereby as the draft rod is pulled down and said levers are rocked, the rods 18 may swing freely with respect to such knife edges in a substantially frictionless manner.

The levers 8, when at rest, may, at their weighted ends 8$^a$, rest against suitable seats 23 carried by frame 7.

Motion is to be communicated from lever 8 to indicating means to indicate the weight of the article being weighed. In the example illustrated a pointer or indicator 24 is carried by a shaft 25, the pointer being adapted to sweep over dial 2 in an ordinary manner. It will be obvious, however, that, in a well-known manner, the dial may be connected with shaft 25 to be rotated thereby with respect to a zero point on casing 1. Shaft 25 may be supported in any suitable manner. I have shown said shaft supported upon pairs of rollers 26 that are journaled in bearings on brackets 27 suitably spaced apart and supported by frame 7. A pinion 28 is secured upon shaft 25, and adapted to receive a rack 29 that is operatively connected with an arm 30 shown pivotally supported upon frame 7 at 31, which arm is adapted to be operated by a lever 8. I have shown lever 8 provided with an actuator 32 for said arm, the actuator being shown having a cam-like groove 32$^a$ receiving a roller 33 at the end of arm 30, whereby when lever 8 is caused to rock by the weight of the article being weighed, and the weighted end of the lever rises, the actuator 32 will move arm 30 a proper distance. The rack 29 is shown resting upon pinion 28 and pivotally connected with arm 30 at 34, whereby as said arm is rocked through the action of lever 8 and actuator 32 said rack will be correspondingly reciprocated to cause rotation of pinion 28 and the indicator. The arrangement is such that the teeth of rack 29 will be kept snugly in contact with the teeth of pinion 28 in all positions, and the teeth of said rack and pinion may be so shaped that their pitch lines will always coincide. Or, in other words, the teeth of the rack will ride on the teeth of the pinion, by reason of the rack above the pinion resting on the latter, whereby to avoid lost motion between such teeth to cause accurate operation of the indicator, the teeth of the rack, however, not engaging the metal at the bottom of the teeth of the pinion. To regulate or control the weight or pressure of the rack upon the pinion, the rack may be provided with a weight 29ª which may be adjusted along the rack for the purpose stated. A screw 29ᵇ may retain the weight in adjusted position along the rack.

My improvements are simple and relatively cheap to manufacture, are not liable to get out of order, and the parts may be readily replaced when required. A main advantage of my invention is that the weighted lever is supported in a most delicate manner upon delicately poised movable members which may readily rock, and whereby, due to the substantially frictionless motion of said members upon the knife edges, the pivots or gudgeons 9 may roll in contact with the peripheries of members 10 without appreciable resistance from the latter, and, therefore, without danger of said pivots or gudgeons slipping or skidding on the surfaces of members 10, overcoming thereby the tendency to cause inaccurate indicating of weights, which would be liable to occur in case the members 10 presented frictional resistance to the free rolling or rotating of pivots or gudgeons 9 thereon.

While I have illustrated and described a practical and efficient embodiment of my invention it will be understood that the same is not limited to the particular details of construction and relative arrangement of parts set forth, as the same may be varied, within the scope of the appended claims, without departing from the spirit of the invention.

Having now described my invention what I claim is:—

1. A measuring instrument comprising a lever having pivots, movable members adapted to support said pivots and having recesses extending downwardly, and upwardly disposed knife edges receiving said recesses to freely support said members thereon, said lever having an actuator, an arm coöperative with the actuator, an indicator, and means operative between the arm and the indicator to operate the latter.

2. A measuring instrument comprising a lever having pivots, movable members adapted to support said pivots, and knife edges supporting said members, the apices of said knife edges lying in planes which coincide at the axis of said pivots.

3. A measuring instrument comprising a lever having pivots, movable members adapted to support said pivots and having V-like recesses extending downwardly, and upwardly disposed knife edges, the apices of said knife edges and of said recesses abutting and lying in corresponding planes which coincide at the axis of said pivots.

4. A measuring instrument comprising a lever having pivots on opposite sides, pairs of movable members spaced apart adapted to support said pivots, and pairs of knife edges on opposite sides of the lever respectively supporting said pairs of members, said lever having an actuator, an arm coöperative with the actuator, an indicator, and means operative between the arm and the indicator to operate the latter.

5. A measuring instrument comprising a lever having pivots on opposite sides, pairs of movable members spaced apart adapted to support said pivots, and pairs of knife edges on opposite sides of the lever respectively supporting said pairs of members, the apices of the knife edges of each pair lying in planes that coincide at the axis of said pivots.

6. A weighing scale comprising draft mechanism, a lever movably connected at one end with said mechanism and weighted at the other end, said lever having pivots on opposite sides, pairs of members on opposite sides of the lever and having curved surfaces supporting said pivots, and pairs of knife edges on opposite sides of the lever respectively supporting said members, the apices of said knife edges lying in planes which coincide as the axis of said pivots.

Signed at New York city, in the county of New York, and State of New York, this 9th day of May, A. D. 1916.

JOSEPH C. BARRETT.

Witnesses:
T. F. BOURNE,
MARIE F. WAINRIGHT.

Copies of this patent may be obtained for five cents each, by addressing the "Commissioner of Patents, Washington, D. C."